March 29, 1955
G. A. LYON
2,705,172
WHEEL COVER
Filed Aug. 9, 1952
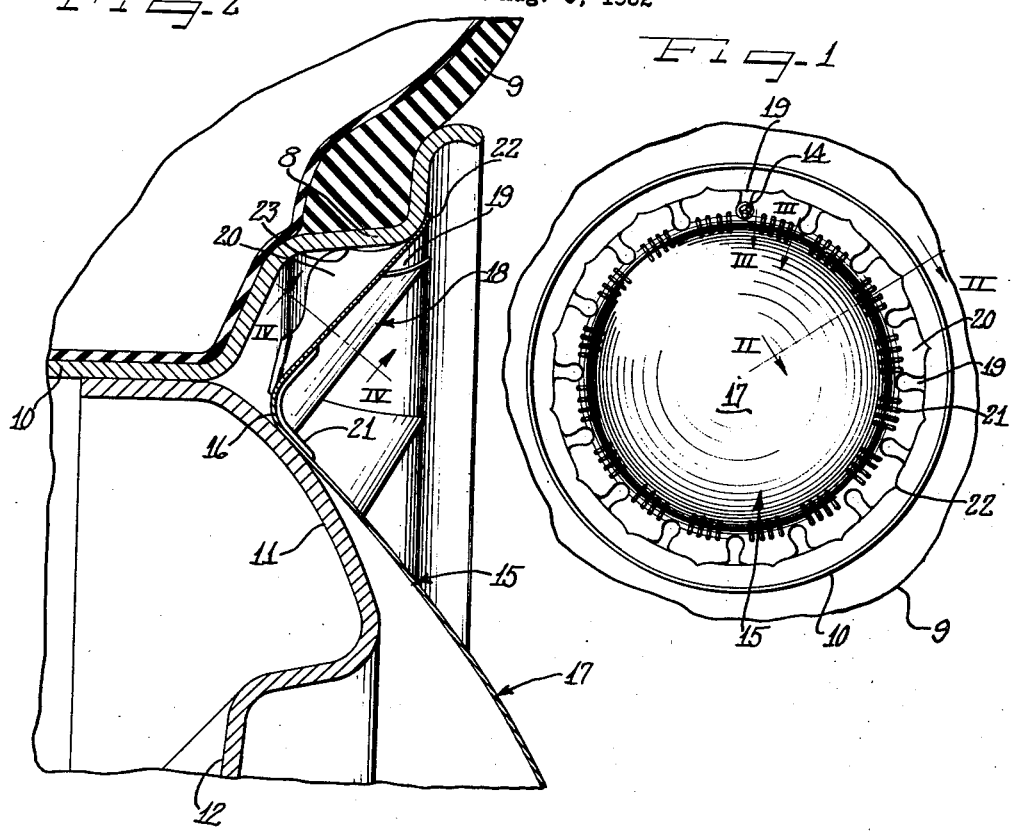
Inventor
George Albert Lyon

United States Patent Office 2,705,172
Patented Mar. 29, 1955

2,705,172

WHEEL COVER

George Albert Lyon, Detroit, Mich.

Application August 9, 1952, Serial No. 303,494

6 Claims. (Cl. 301—37)

This invention relates to automobile wheel covers and more particularly to a wheel cover which has a spoke-like appearance.

An object of this invention is to provide a wheel cover with separated peripheral segments which in addition to forming ornamental spokes also serve as a means for retaining the cover on an automobile wheel.

Another object of this invention is to so reinforce the spokes of the aforesaid cover so that they will be better able to serve as cover retaining fingers.

In accordance with the general features of the invention there is provided in a cover structure, for a wheel including flanged tire rim and body parts, a circular wheel cover having a dished annular portion defined by divergent radially outer and inner portions, the radial outer portion being divided into a plurality of radially extending segments each of which simulates a spoke and has an edge for resilient cover retaining engagement with a flange of the tire rim; the cover at the juncture of the divergent portions being ribbed to reinforce the spoke segments.

Another feature of the invention relates to providing an article of manufacture or wheel cover of the aforementioned type wherein the ribs are arranged in a series of sets of radial ribs each set being common to one spoke or finger.

Another feature of the invention relates to providing a modification of the invention wherein the reinforcing ribs comprise annular corrugations at or adjacent to the juncture of the divergent portions of the cover so that they are disposed at the bases of the spokes or fingers.

Other objects and features of this invention will more fully appear from the following detailed description taken in connection with the accompanying drawing which illustrates a single embodiment thereof and in which:

Figure 1 is a fragmentary side view of a wheel structure having my cover applied thereto;

Figure 2 is an enlarged fragmentary cross-sectional view taken on substantially the line II—II of Figure 1 looking in the direction indication by the arrows;

Figure 3 is a fragmentary cross-sectional view taken on substantially the line III—III of Figure 1 showing the contour of the ribs and looking in the direction indicated by the arrows;

Figure 4 is an enlarged fragmentary cross-sectional view through one of the spokes or fingers of the cover and taken on substantially the line IV—IV of Figure 2; and Figure 5 is an enlarged fragmentary cross-sectional view similar to Figure 2 showing a modified form of reinforcing ribs.

As shown on the drawings:

The wheel cover of my invention is adapted for use with a conventional automobile wheel which includes the usual tire and tube assembly 9 carried in the customary way on a multi-flanged drop center type of tire rim 10. This tire rim 10 is in turn supported and carried by a dished wheel body 11 including a central bolt-on flange 12 adapted to be secured in the customary way to a part on the axle of the vehicle.

Cooperable with this conventional wheel is my novel wheel cover designated generally by the reference character 15 and which preferably is in the form of a metallic stamping. It may be made from any suitable sheet material such, for example, as thin stainless steel strip or sheet which lends itself to a high lustrous finish.

The cover 15 includes a dished intermediate annular portion 16 defined on its sides by divergent radially inner and outer portions 17 and 18 respectively. The portion 17 is bulged outwardly in the form of a crown and is adapted to extend over the center of the wheel although if it is so desired it may be furnished with a detachable hub cap (not shown) in a manner well known to those familiar with this art.

The outer radial portion 18 is provided with a plurality of spaced key-shaped slots 19 which are equi-distantly spaced around the peripheral margin of the cover. These slots or slits provide the peripheral margin of the cover with a plurality of separated radially projecting segments 20 each of which is convexly shaped or dished. The segments 20 in reality appear to be spokes when the cover 15 is on the wheel.

In accordance with the features of this invention each of these spoke-like segments 20 is reinforced by a set of radially extending ribs 21 located at the base of the segment and extending through the junction portion 16 of the cover as shown in Figure 2.

The outermost extremity of each segment 20 is formed into a lip 22 adapted to overlap the shouldered end of tire rim flange 8 for the purpose of assisting in preventing cocking of the cover when it is applied to the wheel.

In addition, each segment 20 is formed with a rearwardly projecting rounded edge 23 for gripping engagement with the surface of the inclined rim flange 8 to retain the cover on the wheel.

It will be noted from Figure 1 that the usual valve stem 14 of the conventional tire and tube assembly 9 can project through one of the slots 19 in the cover so as to be accessible from the exterior of the cover.

In the application of the cover to the wheel it is first placed over the wheel with one of the slots 19 in alignment with the valve stem 14 and it is then pressed axially into the wheel. In the course of this application of the cover to the wheel the lips 22 engage the shoulder of rim flange 8 and the junction portion 16 of the cover bottoms against the body part 11 of the wheel. As noted before, the radial lips 22 in engaging the rim serve to prevent cocking of the cover. Also, as the cover is pushed home into the wheel the edges 23 of the spoke segments 20 slide along the surface of rim flange 8 and are resiliently cammed thereby so that they are in stressed resilient gripping engagement with the rim flange.

Accordingly, it is clear that the segments 20 not only serve to provide the cover with a spoked appearance but, in addition, constituting the retaining means for the cover. In addition, by providing the radial ribs 21 at the junction portion 16, I am able to reinforce each of the segments and in that way to compensate for any weakness that might be occasioned by the provision of the slots 19.

In Figure 5 I have illustrated a modified form of cover 15' adapted to be applied to the same type of wheel as is shown in Figure 2. In this modification of the invention the junction portion 16' of the cover 15' leads into a plurality of annular corrugations 21' which are in the crown portion 17' of the cover. Except for the corrugations or ribs 21', this form of cover is the same as the one described before.

I claim as my invention:

1. In a wheel structure including a wheel body and a flanged tire rim, a circular wheel cover for the outer side of the wheel having a dished annular portion defined by divergent radially outer and inner portions for respectively overlying the tire rim and the wheel body, said radially outer portion being divided into a plurality of radially extending segments each of which simulates a spoke and has an edge providing a pair of wing-like flange portions disposed for resilient cover retaining engagement with a flange of a tire rim, said cover at the juncture of said divergent portions being ribbed to reinforce said spoke segments at their juncture with the main body of the cover.

2. As an article of manufacture, a circular wheel cover having a dished annular portion defined by divergent radially outer and inner portions, said radially outer portion being divided into a plurality of radially extending segments each of which simulates a spoke and has an edge for resilient cover retaining engagement with a flange of a wheel rim, said cover at the juncture of said divergent portions being ribbed to reinforce said spoke segments at their juncture with the main body of the cover, the ribs comprising a series of sets of circumferentially spaced radial ribs, each set being common to a segment whereby resilient deflection of the segment will be resisted thereby.

3. In a wheel structure including a multi-flange tire rim having an intermediate flange and a wheel body supporting the tire rim, a cover for disposition at the outer side of the wheel comprising radially inner and radially outer dished portions, the radially outer portion being divided into a plurality of radially extending segments each of which generally simulates a wheel spoke and has edge flange structure directed generally axially inwardly and providing generally radially outwardly projecting edges engageable under resilient tensioned thrust against said intermediate flange for retaining the cover on the wheel, said cover at juncture of the divergent portions being multi-ribbed to reenforce said spoke segments at their juncture with said radially inner portion of the cover.

4. In a wheel structure including a multi-flange tire rim having an intermediate flange and a wheel body supporting the tire rim, a cover for disposition at the outer side of the wheel comprising radially inner and radially outer dished portions, the radially outer portion being divided into a plurality of radially extending segments each of which generally simulates a wheel spoke and has edge flange structure directed generally axially inwardly and providing generally radially outwardly projecting edges engageable under resilient tensioned thrust against said intermediate flange for retaining the cover on the wheel, said cover at juncture of the divergent portions being multi-ribbed to reenforce said spoke segments at their juncture with said radially inner portion of the cover, said ribs comprising a plurality of ribs extending across the juncture.

5. In a wheel structure including a multi-flange tire rim having an intermediate flange and a wheel body supporting the tire rim, a cover for disposition at the outer side of the wheel comprising radially inner and radially outer dished portions, the radially outer portion being divided into a plurality of radially extending segments each of which generally simulates a wheel spoke and has edge flange structure directed generally axially inwardly and providing generally radially outwardly projecting edges engageable under resilient tensioned thrust against said intermediate flange for retaining the cover on the wheel, said cover at juncture of the divergent portions being multi-ribbed to reenforce said spoke segments at their juncture with said radially inner portion of the cover, each of said segments having a tip bearing against the tire rim at the axially outer side of said intermediate flange.

6. In a wheel structure including a multi-flange tire rim having an intermediate flange and a wheel body supporting the tire rim, a cover for disposition at the outer side of the wheel comprising radially inner and radially outer dished portions, the radially outer portion being divided into a plurality of radially extending segments each of which generally simulates a wheel spoke and has edge flange structure directed generally axially inwardly and providing generally radially outwardly projecting edges engageable under resilient tensioned thrust against said intermediate flange for retaining the cover on the wheel, said cover at juncture of the divergent portions being multi-ribbed to reenforce said spoke segments at their juncture with said radially inner portion of the cover, said radially inner portion bottoming against the wheel body.

References Cited in the file of this patent

UNITED STATES PATENTS

| | | |
|---|---|---|
| 2,148,213 | Lyon | Feb. 21, 1939 |
| 2,244,014 | Lyon | June 3, 1941 |
| 2,308,618 | Lyon | Jan. 19, 1943 |